US008183179B2

(12) United States Patent
Garcia-Lopez De Victoria et al.

(10) Patent No.: US 8,183,179 B2
(45) Date of Patent: May 22, 2012

(54) SYSTEM, METHOD, AND APPARATUS FOR ACID FRACTURING WITH SCALE INHIBITOR PROTECTION

(75) Inventors: Marieliz Garcia-Lopez De Victoria, Sugar Land, TX (US); John W. Still, Katy, TX (US); Toan Bui, Pearland, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/025,302

(22) Filed: Feb. 11, 2011

(65) Prior Publication Data

US 2011/0127039 A1    Jun. 2, 2011

Related U.S. Application Data

(62) Division of application No. 12/175,203, filed on Jul. 17, 2008, now Pat. No. 7,886,822.

(51) Int. Cl.
*C09K 8/52* (2006.01)
*C09K 8/516* (2006.01)
*E21B 43/28* (2006.01)

(52) U.S. Cl. .......... 507/90; 507/203; 507/261; 507/262; 507/267; 507/269; 507/277; 507/902; 507/906; 507/921; 507/922; 507/927; 507/933

(58) Field of Classification Search ............ 507/90, 507/203, 261, 262, 267, 269, 277, 902, 906, 507/921, 922, 927, 933
See application file for complete search history.

(56) References Cited

U.S. PATENT DOCUMENTS

| 4,061,695 | A | 12/1977 | Tai |
| 4,986,354 | A | 1/1991 | Cantu et al. |
| 5,023,001 | A | 6/1991 | Amjad |
| 5,060,728 | A | 10/1991 | Yan |
| 5,089,150 | A | 2/1992 | Hen |
| 5,856,409 | A | 1/1999 | Ziemelis |
| 6,379,612 | B1 | 4/2002 | Reizer |
| 6,380,136 | B1 | 4/2002 | Bates |
| 7,166,560 | B2 | 1/2007 | Still |
| 7,216,705 | B2 | 5/2007 | Saini |
| 7,261,156 | B2 | 8/2007 | Nguyen |
| 7,332,459 | B2 | 2/2008 | Collins |
| 2004/0152601 | A1 | 8/2004 | Still et al. |
| 2008/0017382 | A1 | 1/2008 | Harris et al. |
| 2008/0119374 | A1* | 5/2008 | Willberg et al. ............ 507/209 |

FOREIGN PATENT DOCUMENTS

| EP | 1534927 B1 | 4/2008 |
| GB | 2412389 A * | 9/2005 |
| GB | 2412390 A | 9/2005 |
| WO | 03106809 A1 | 12/2003 |
| WO | 2005017313 A1 | 2/2005 |

* cited by examiner

*Primary Examiner* — Timothy J. Kugel
(74) *Attorney, Agent, or Firm* — Michael Dae; Daryl Wright; Robin Nava

(57) ABSTRACT

A method for treating a subterranean formation includes forming a treatment fluid including a carrier fluid, a solid acid-precursor, and a solid scale inhibitor. The solid acid-precursor includes a material that forms an acid at downhole conditions in the subterranean formation. The method further includes adding a solid acid-responsive material into the treatment fluid, where the solid acid-responsive material enhances formation of acid from the solid acid-precursor in acidic conditions. The method includes performing an acid fracture treatment and inhibiting scale formation within the subterranean formation. The solid scale inhibitor allows for long-term scale inhibition after the treatment.

29 Claims, 3 Drawing Sheets

SYSTEM, METHOD, AND APPARATUS FOR ACID FRACTURING WITH SCALE INHIBITOR PROTECTION

CROSS REFERENCE

This application claims priority as a divisional patent application of U.S. patent application Ser. No. 12/175,203, now U.S. Pat. No. 7,886,822, filed Jul. 17, 2008, entitled "System, Method, and Apparatus for Acid Fracturing with Scale Inhibitor Protection" which claims priority to U.S. Provisional Patent Application No. 60/952,395, filed Jul. 27, 2007, entitled "One-Step Acid Fracture and Scale Inhibitor Treatment." Both of these applications are hereby incorporated by reference herein in their entirety.

The present application claims the benefit of U.S. Patent Provisional Application No. 60/952,395 entitled "One step acid fracture and scale inhibitor treatment", filed Jul. 27, 2007, which is incorporated herein by reference.

The present application is related to U.S. Patent Provisional Application No. 60/952,382 entitled "Fracture treatment fluid including a granular scale inhibitor composition and method of use", filed Jul. 27, 2007, and to United States patent application entitled "System, method, and apparatus for combined fracturing treatment and scale inhibition" filed Jul. 17, 2008, both of which are incorporated herein by reference.

FIELD OF THE INVENTION

The present invention relates to inhibiting scale formation in wells, and more particularly but not exclusively relates to inhibiting scale formation and acid fracturing in a single treatment step.

BACKGROUND

The statements in this section merely provide background information related to the present disclosure and may not constitute prior art.

Acid fracturing is utilized to etch flowpaths in the fracture face that remain open after the fracture closes, and to penetrate deeply away from the wellbore creating flowpaths (e.g. wormholes) that help bring fluid more quickly to the fracture and the wellbore. However, acid fracturing of formations involves many challenges. When direct acid fluids are utilized, the acid can react quickly near the wellbore and fail to penetrate deeply into the formation to increase productivity. Further, acid fluids can corrode metal parts and other components in the wellbore, causing excessive wear and picking up undesirable metals in the fracturing fluid that can cause precipitates to form. Therefore, treatments often include retarding the acid and/or limiting the volume or pumping time of a treatment.

Retardation mechanisms known in the art include the use of emulsified acids, the use of low concentration acids, gelled acids, and/or the use of liquids that form acids on contact with water allowing acid to form in the wellbore and/or formation. The use of liquids to form acids also has limited benefit, as acid precursors in a liquid phase react very quickly to become acids thereby limiting the delay effect of generating acid in the wellbore. Further, the introduction of water and/or additional fluid volumes (e.g. due to low acid concentrations) introduces or exacerbates scale formation problems. Scale formation problems can also be a significant problem in formations including carbonates, which are common formations for acid fracturing treatments.

Scale formation in fluid-producing wells can reduce productivity of the well or even stop production completely. Scale formation chemistry is generally understood, and conventional scale inhibition treatments are known in the art. However, currently available scale inhibition treatments suffer from several drawbacks. One conventional scale inhibition method consists of injecting a fluid including a scale inhibitor chemical into a formation, and flushing the chemical away from the wellbore with an amount of follow-up flushing fluid, where the chemical may be designed to adsorb to formation particle surfaces. The scale inhibitor chemical may be included in a water-based or oil-based fluid.

One conventional scale treatment involves coating particles with resin, and coating the resin with scale inhibitor to prevent the resin coated particles from sticking together before treatment is completed, while the scale inhibitor coating provides some scale inhibition after the treatment. Unfortunately, currently available scale inhibition treatments suffer from a few drawbacks. For example, currently available scale inhibition treatments do not inhibit scale for long periods of time and therefore require repeated application. In high flow areas of a well, for example in a fracture, the scale inhibitor is removed by producing fluid quickly reducing the effectiveness of the treatment. Also, the available concentration of scale inhibitor declines rapidly after initial treatment, and therefore the scale inhibition procedure must be repeated often or overdesigned with initial concentrations much higher than required to inhibit scale. Accordingly, there is a demand for further improvements in this area of technology.

SUMMARY

One embodiment is a unique treatment fluid for acid fracturing and inhibiting scale formation in a producing well. Other embodiments include unique systems and methods to form acid in the formation. Further embodiments, forms, objects, features, advantages, aspects, and benefits shall become apparent from the following description and drawings.

DESCRIPTION OF THE ILLUSTRATIVE EMBODIMENTS

Figure 1:
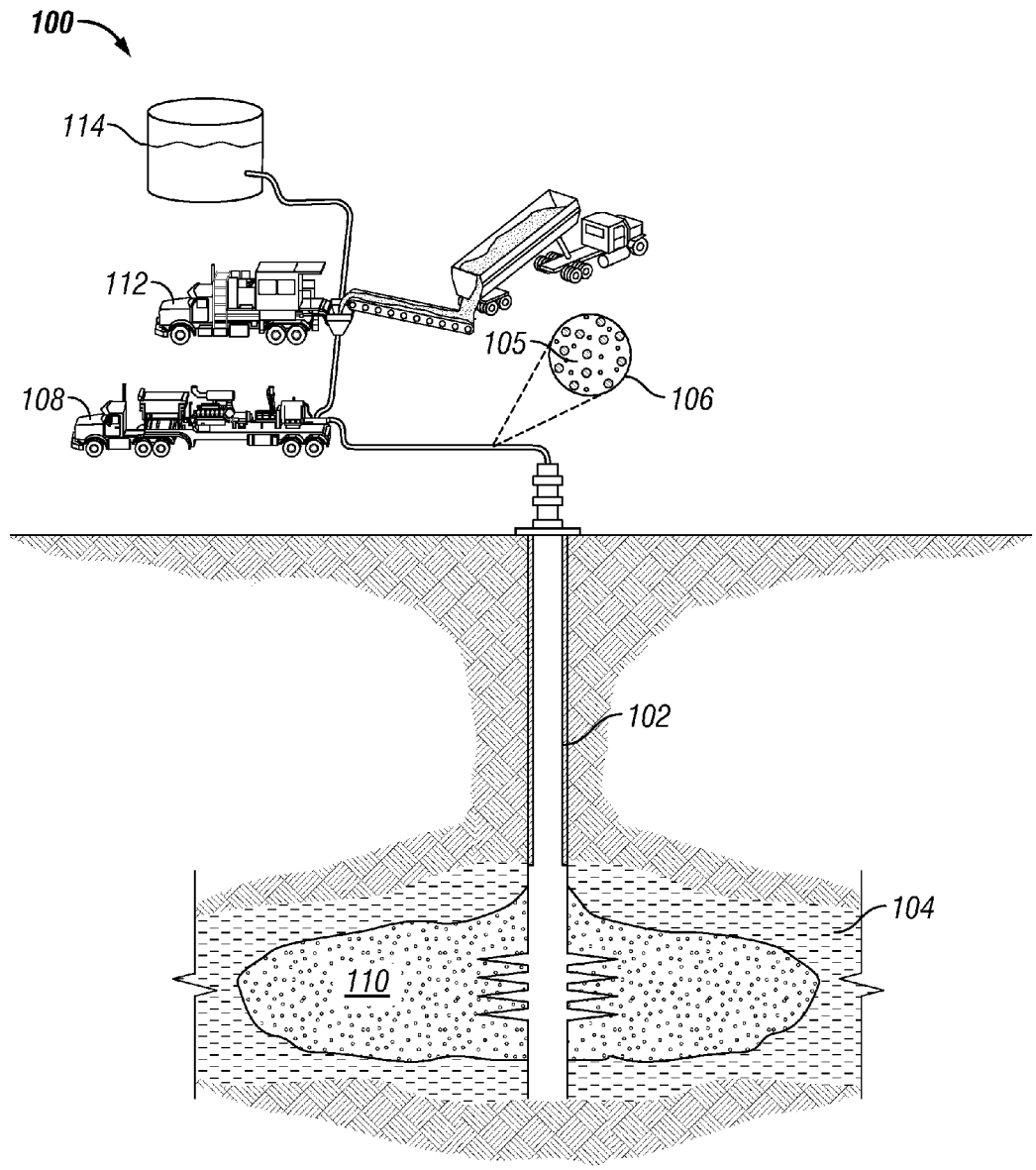
FIG. 1 is a schematic diagram of a system for acid fracturing and scale inhibition.

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations and further modifications in the illustrated embodiments, and any further applications of the principles of the invention as illustrated therein as would normally occur to one skilled in the art to which the invention relates are contemplated and protected. In addition, the compositions used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

FIG. 1 is a schematic diagram of a system 100 for acid fracturing and scale inhibition. The system 100 includes a wellbore 102 intersecting a subterranean formation 104. The subterranean formation 104 may be a hydrocarbon bearing formation, or any other formation where fracturing may be utilized and inhibiting scale formation may be desirable. In certain embodiments, the subterranean formation 104 may related to an injection well (such as for enhanced recovery or for storage or disposal) or a production well for other fluids such as carbon dioxide or water. In certain embodiments, the system 100 includes an amount of treatment fluid 106. The treatment fluid 106 includes a carrier fluid 105, a solid acid-precursor, and a solid scale inhibitor.

The formation 104 may be a formation that is enhanceable by an acid fracturing treatment, for example a limestone and/or dolomite reservoir, or a reservoir having acid treatable minerals mixed in with other materials such as sandstone. In certain embodiments, the system includes a pump 108 to fracture the formation, and to place the treatment fluid 106 into the fracture 110. The fracture 110 includes an acid fracture, which may be a hydraulically initiated fracture having a fracture face etched with acid, and/or an acid induced fracture. The fracture 110 may include wormholes and/or other flowpaths into the formation 104. The fracture 110 may be propped open with a proppant, or the fracture may retain highly conductive flow paths after closure due to acid etching. In certain embodiments, the fracture 110 retains particulates from the treatment fluid 106 that may not be ordinary proppant—for example particles present may include solid scale inhibitor particles, solid acid-precursor particles, solid acid-responsive material particles, and/or particles that include mixtures of one or more of the preceding solids.

In certain embodiments, the solid acid-precursor begins to hydrolyze on contact with water, either water in the carrier fluid 105 and/or in the formation 104. The solid acid-precursor may be designed to hydrolyze at elevated temperatures such as experienced in the formation 104. In certain embodiments, the hydrolysis rate of the solid acid-precursor is selected by changing particle sizes, compositions of the treatment fluid 106, and/or by selection of a solid acid-responsive material in contact with the treatment fluid 106. In certain embodiments, the solid acid-precursor includes a coating that delays hydrolysis. The coating may include a material that degrades under conditions experienced in the formation 104 and/or that degrades in the treatment fluid 106 over a time interval relevant to the expected time to perform the fracture treatment. As the solid acid-precursor hydrolyzes, an acid is formed in the formation 104 and fracture 108, allowing fresh acid to be formed in a region where the acid is less likely to corrode equipment and pick up metals, and where the acid is more likely to react with favorable regions of the formation 104.

In some embodiments, the solid acid-precursor is a cyclic ester dimer of lactic acid, a cyclic ester dimmer of glycolic acid, a homopolymer of lactic acid, a homopolymer of glycolic acid, a copolymer of lactic acid, and/or a copolymer of glycolic acid. In certain embodiments, the solid acid-precursor is a copolymer of glycolic acid and/or lactic acid, and further includes a hydroxyl-containing moiety, a carboxylic acid-containing moiety, and/or a hydroxycarboxylic acid-containing moiety.

In some embodiments, the fracturing fluid does not normally contain an acid when it is prepared at the surface and injected into the wellbore. However, the carrier fluid 105 may include an acid, a reduced-concentration acid, intermittent stages of acid, emulsified acid, or any other base fluid understood in the art.

In certain embodiments, acid can be generated downhole from precursors including solid cyclic dimers, or solid polymers, of certain organic acids, that hydrolyze under known and controllable conditions of temperature, time, and pH to form the organic acids. These solid materials, or "acid-precursors", result in the formation of acid downhole, or "delayed acid generation". One example of a suitable solid acid-precursor is the solid cyclic dimer of lactic acid (known as "lactide"), which has a melting point of 95 to 125° C., (depending upon the optical activity). Another suitable example is a polymer of lactic acid, (sometimes called a polylactic acid (or "PLA"), or a polylactate, or a polylactide). Another suitable example is the solid cyclic dimer of glycolic acid (known as "glycolide"), which has a melting point of about 86° C. Yet another suitable example is a polymer of glycolic acid (hydroxyacetic acid), also known as polyglycolic acid ("PGA"), or polyglycolide. Another example is a copolymer of lactic acid and glycolic acid. These polymers and copolymers are polyesters.

The PLA polymers are solids at room temperature and are hydrolyzed by water to form lactic acid. Some typical commercially available polymers have crystalline melt temperatures of from about 120 to about 170° C., but others are obtainable. Poly(d,l-lactide) is available with molecular weights of up to 500,000. Polyglycolic acid (also known as polyglycolide) and various copolymers of lactic acid and glycolic acid, often called "polyglactin" or poly(lactide-co-glycolide) are also available. The rates of the hydrolysis reactions of all these materials are governed by the molecular weight, the crystallinity (the ratio of crystalline to amorphous material), the physical form (size and shape of the solid), and in the case of polylactide, the amounts of the two optical isomers. (The naturally occurring l-lactide forms partially crystalline polymers; synthetic dl-lactide forms amorphous polymers.) Amorphous regions are more susceptible to hydrolysis than crystalline regions. Lower molecular weight, less crystallinity and greater surface-to-mass ratio all result in faster hydrolysis. Hydrolysis is accelerated by increasing the temperature, by adding acid or base, or by adding a material that reacts with the hydrolysis product(s). Specific materials described herein are provided as examples only, and are not intended to be limiting.

Homopolymers can be more crystalline; copolymers tend to be amorphous unless they are block copolymers. The extent of the crystallinity can be controlled by the manufacturing method for homopolymers and by the manufacturing method and the ratio and distribution of lactide and glycolide for the copolymers. Polyglycolide can be made in a porous form. Some of the polymers dissolve very slowly in water before they hydrolyze. In certain embodiments, other materials may be used as solid acid-precursors such as polymers of hydroxyacetic acid (glycolic acid) with itself or other hydroxy-, carboxylic acid-, or hydroxycarboxylic acid-containing moieties, for example as described in U.S. Pat. No. 4,848,467 (Formation fracturing process, assigned to E.I. DuPont de Nemours and Company); U.S. Pat. No. 4,957,165 (Well treatment process, assigned to Conoco Inc.); and U.S. Pat. No. 4,986,355 (Process for the preparation of fluid loss additive and gel breaker, assigned to Conoco Inc.).

In certain embodiments, the system 100 includes a solid acid-responsive material in contact with the treatment fluid 106. In certain embodiments, the solid acid-responsive material contacts the treatment fluid 106 by physical addition to the treatment fluid 106—for example as a particle added to the treatment fluid 106. In certain further embodiments, the solid acid-responsive material is physically mixed with the solid acid-precursor, either prior to adding the solid acid-precursor to the carrier fluid 105 and/or by addition to the treatment fluid 106. In certain embodiments, the solid acid-responsive material is a part of the formation 104, and is contacted with the treatment fluid 106 upon injection of the treatment fluid 106 into the formation 104.

In certain embodiments, the solid acid-responsive material is a material that responds to an acid presence by dissolving and/or reacting. In certain embodiments, the solid acid-responsive material is an acid-precursor hydrolysis accelerant. The solid acid-responsive material accelerates hydrolysis of the acid-precursor through physical and/or chemical means.

For example, the solid acid-responsive material may be included with the solid acid-precursor in a particle, and when the solid acid-responsive material reacts or dissolves in the presence of acid, the particle may break apart into many pieces greatly increasing the surface area contact of the solid acid-precursor and accelerating the hydrolysis of the precursor. In another example, the solid acid-responsive material may be an agent that accelerates the hydrolysis of the solid acid-precursor when the solid acid-responsive material dissolves into the liquid phase. In another example, the solid acid-responsive material modifies the properties of the liquid present to enhance hydrolysis of the solid acid-precursor, for example by introducing carbon dioxide into the solution Any acceleration mechanism understood in the art is contemplated in the present application. In certain embodiments, more than one acceleration mechanism from the solid acid-responsive material may be presented.

In certain embodiments, the solid acid-responsive material is magnesium hydroxide, magnesium carbonate, dolomite, calcium carbonate, aluminum hydroxide, calcium oxalate, calcium phosphate, aluminum metaphosphate, sodium zinc potassium polyphosphate glass, and/or sodium calcium magnesium polyphosphate glass. In certain embodiments, the solid acid-responsive material is a water-soluble acid-precursor hydrolysis accelerant. In certain further embodiments, the water-soluble accelerant is an ester, a cyclic ester, a diester, an anhydride, a lactone, an amide, an anhydride, an alkali metal alkoxide, a carbonate, a bicarbonate, an alcohol, an alkali metal hydroxide, an ammonium hydroxide, an amine, and/or an alkanol amine. In certain embodiments, the water-soluble accelerant is sodium hydroxide, potassium hydroxide, ammonium hydroxide, and/or propylene glycol diacetate.

In certain embodiments, the treatment fluid 106 includes solid (e.g. granular) scale inhibitor particles comprising at least partially, or even completely, solid scale inhibitor. In certain embodiments, the amount of particles include proppant particles having a porosity—for example porous ceramic proppant particles—and having scale inhibitor stored within the porosity. In certain further embodiments, the scale inhibitor stored within the proppant porosity can be scale inhibitor adsorbed to internal surfaces of the proppant, and/or scale inhibitor packed into the bulk porosity of the proppant. In certain embodiments, the proppant may be impregnated with the scale inhibitor. In certain further embodiments, the treatment fluid includes scale inhibitor as granular scale inhibitor particles and further includes scale inhibitor within a porous proppant particle.

The storage of scale inhibitor within the defined volume of solid particles rather than within the liquid phase of the treatment fluid allows for a greater concentration of scale inhibitor and a configurable dispersion or dissolution time for the scale inhibitor. Further, the storage of scale inhibitor within the defined volume of solid particles allows for a greater concentration and a configurable dispersion or dissolution time for the scale inhibitor relative to a surface coating of scale inhibitor, including dispersion times that can be much greater than the dispersion times of a surface coated scale inhibitor. In certain embodiments, additional scale inhibitor may be included in the liquid phase of the treatment fluid and/or on the surface of or as a coating for the particles.

In certain embodiments, the solid granular scale inhibitors particles include mixtures, blends, and/or filled polymers and the like and may be manufactured in various solid shapes, including, but not limited to fibers, beads, films, ribbons and platelets. The scale inhibitor may be coated to promote adsorption to surfaces or to slow dissolution. Non-limiting examples of coatings include polycaprolate (a copolymer of glycolide and epsilon-caprolactone), and calcium stearate, both of which are hydrophobic. The term "coating" as used herein may refer to encapsulation or simply to changing the surface by chemical reaction or by forming or adding a thin film of another material. In certain further embodiments, the coating includes a material that degrades in contact with a hydrocarbon, a material that degrades at a downhole temperature, and/or a material that degrades in a formation brine.

The appropriate combination of carrier fluid, scale inhibitor and solid acid-precursor may be selected readily from available materials. The rate of dissolution of the granular scale inhibitor is governed by factors such as the choice of material, the ratio of materials, the particle size, calcining and coating of the solid material, the fluids and temperature in the subterranean formation 104, and may readily and easily be determined by routine measurements. The rate of hydrolysis of solid acid-precursor particles and dissolution/reaction of solid acid-responsive materials are determined according to similar considerations and can also be determined by routine measurements.

A scale inhibitor or inhibitors should be selected to be compatible with the function of other components of the treatment fluid 106. The granular scale inhibitor and/or proppant including inhibitor may be part of a suspension in a treatment fluid in the wellbore, in the perforations, in a fracture 110, as a component of a filter cake on the walls of a wellbore 102 or of a fracture 110, and/or in the pores of the subterranean formation 104. In certain embodiments, the subterranean formation 104 may be carbonate (including limestone and/or dolomite) or sandstone, although other formations benefitting from scale inhibition are also contemplated.

In certain embodiments, the granular scale inhibitor is structured to degrade over time. The particle size of the granular scale inhibitor may be almost any size transportable by the carrier fluid. Governing factors for size selection include at least a) the capability of equipment (e.g. a pump 108 and blender 112), b) the width of the fracture 110 generated, and c) the desired rate and time of particle degradation. The rate of degradation can readily be determined by routine measurements in a laboratory with a given fluid at a given temperature. In certain embodiments, the particles sizes of the granular scale inhibitor are selected to be similar to a proppant size and/or a fluid loss additive size. In certain embodiments, the granular scale inhibitor includes the scale inhibitor and one or more other particulate materials.

In certain embodiments, additives are included as ordinarily used in oilfield treatment fluids 106. If an additive includes a component (such as a buffer or a viscosifier) that may interact with the scale inhibitor, then either the amount or nature of the scale inhibitor, or the amount or nature of the interfering or interfered-with component may be adjusted to compensate for the interaction. Routine measurements and fluid tests in a laboratory may quantify additive-inhibitor interactions.

In certain embodiments, the treatment fluid 106 includes an activator present in an amount between about 0.1% and 50% by weight of the scale inhibitor. In certain further embodiments, the activator reacts with a fraction of the scale inhibitor to form a gel precipitate in the fracture 110 and/or subterranean formation 104. The gel precipitate slowly dissolves in produced fluids from the subterranean formation 104, releasing scale inhibitor into the produced fluid. In certain embodiments, the activator includes a divalent ion, an ionic salt, and/or calcium chloride. In certain embodiments, the scale inhibitor includes a chemical that adsorbs to the matrix of the subterranean formation 104, with or without the addition of an activator.

In certain embodiments, the scale inhibitor includes a compound that inhibits the formation of carbonate and/or phosphate scales. In certain embodiments, the scale inhibitor includes a compound including sulfonates, phosphate esters, phosphonates, phosphonate polymers, polyacrylates and polymethacrylates, polycarboxylates, and phosphorous containing polycarboxylates, and/or phosphonic acid derivatives. In certain embodiments, the scale inhibitor includes a compound including phospino-polylacrylates and/or phosphonic acid ethylene diamine derivatives. In certain embodiments, the scale inhibitor includes a compound including phosphonic acid[1,2-ethanediylbis [nitrilobis(methylene)]]tetrakis, calcium salts thereof, and/or sodium salts thereof. In certain embodiments, the scale inhibitor includes a compound represented by at least one of the following structures:

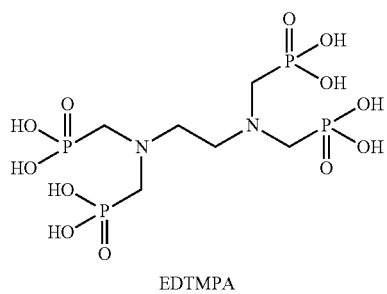

EDTMPA

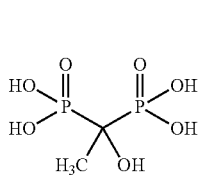

HEDP

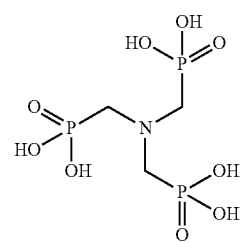

ATMP

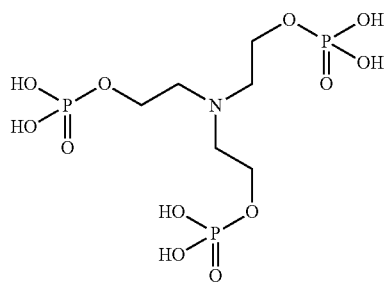

TEA Phosphate Ester

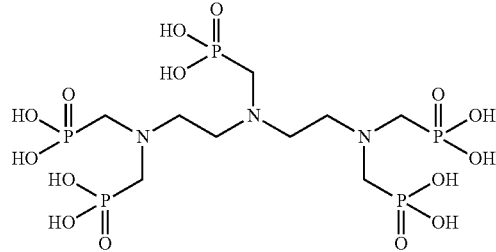

DETA Phosphonate

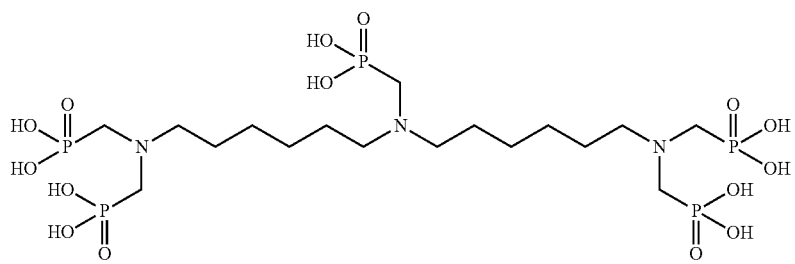

BHMT Phosphonate

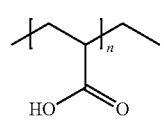

Polyacrylate

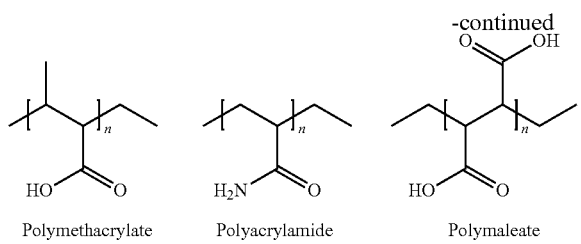

Polymethacrylate  Polyacrylamide  Polymaleate

In certain embodiments, the polymeric and phosphorous type scale inhibitors described preceding are used in brines having pH values between 5.0-8.5. At pH values outside of this range, the effectiveness of these scale inhibitors decreases. However, they may be used at a variety of temperatures and pH ranges including at pH values outside of the described range.

In certain embodiments, hydrolysis of the solid acid-precursors is accelerated by the addition of certain chemical agents. In certain embodiments, a small amount of the accelerating agent (the solid acid-responsive material, or accelerant) is necessary to disrupt the surface and/or otherwise start the hydrolysis process. In certain embodiments, additional accelerant is provided to further accelerate the hydrolysis process. In certain embodiments, no accelerant is included.

In certain embodiments, the solid accelerant does not accelerate the initial hydrolysis of the solid acid-precursor, as the solid accelerant does not interact with the solid acid-precursor. As the solid acid-precursor begins to hydrolyze, the resultant acid reacts with the solid acid-responsive accelerant, which then accelerates the further hydrolysis of the solid acid-precursor. Other accelerant mechanisms are understood and contemplated in the present application. For example, the increasing temperature as the treatment fluid 106 enters the formation can trigger dissolution of the accelerant, as well as degradation of coatings and/or other mechanisms. In certain embodiments, the formation 104 includes a solid accelerant. Furthermore, the action of accelerants may be delayed, for example, if they are slowly soluble solids or if they are chemically bound in a liquid chemical that must be hydrolyzed to release the agent. In certain embodiments, a first solid acid-precursor may be an accelerant for a second solid acid-precursor; for example, PGA accelerates the hydrolysis of PLA. In certain embodiments, a first solid acid-precursor that accelerates a second solid acid-precursor is the solid acid-responsive material. The timing and rate of hydrolysis of the solid acid-precursor is controlled by these techniques.

In certain embodiments, the hydrolysis of solid acid-precursors is accelerated by adding solid materials that are acid-responsive (e.g. acid-soluble and/or acid-reactive), such as but not limited to magnesium hydroxide, magnesium carbonate, dolomite (magnesium calcium carbonate), calcium carbonate, aluminum hydroxide, calcium oxalate, calcium phosphate, aluminum metaphosphate, sodium zinc potassium polyphosphate glass, and sodium calcium magnesium polyphosphate glass, may be mixed with or incorporated into, solid acid-precursors. These mixtures are contacted with the treatment fluid 106, by addition at the surface and/or by contact within the wellbore 102 and/or formation 104. At least a portion of the solid acid-precursor slowly hydrolyzes at controllable rates to release acids at pre-selected locations and times in the fracture. In addition to reacting with the formation fracture face, the acids also react with and dissolve at least a portion of the acid-responsive materials. In certain embodiments, most or all of the solid material initially added is no longer present at the end of the treatment. However, it is not necessary either for all of the solid acid-precursor to hydrolyze or for all of the solid acid-responsive material to dissolve. In certain embodiments, remaining solids act as a proppant in the fracture 110.

The hydrolysis of solid acid-precursors in acid fracturing may also be accelerated by the addition of certain water-soluble acid-precursor hydrolysis accelerants. These accelerants may be acids, bases, or sources of acids or bases. In certain embodiments, water-soluble acid-precursor hydrolysis accelerants are included at low temperatures (for example below about 135° C.), at which the solid acid-precursors hydrolyze slowly and solid acid-responsive materials also dissolve slowly. Non-limiting examples of such soluble liquid additives that hydrolyze to release organic acids are esters (including cyclic esters), diesters, anhydrides, lactones and amides. A suitable compound and amount that hydrolyzes at the appropriate rate for the temperature of the formation 104 and the pH of the treatment fluid 106 is readily identified for a given treatment by simple laboratory hydrolysis experiments.

In certain embodiments, the water-soluble acid-precursor hydrolysis accelerants are bases. For example, the water-soluble acid-precursor hydrolysis accelerants may include sodium hydroxide, potassium hydroxide, and/or ammonium hydroxide. In certain embodiments, the water-soluble acid-precursor hydrolysis accelerants may include alkoxides, water-soluble carbonates and bicarbonates, methanol, ethanol, other alcohols, alkanol amines and organic amines such monoethanol amine and methyl amine. In certain embodiments, the water-soluble acid-precursor hydrolysis accelerants may include acids, for example hydrochloric acid, hydrofluoric acid, ammonium bifluoride, formic acid, acetic acid, lactic acid, glycolic acid, aminopolycarboxylic acids (such as but not limited to hydroxyethyliminodiacetic acid), polyaminopolycarboxylic acids (such as but not limited to hydroxyethylethylenediaminetriacetic acid), salts—including partial salts—of the organic acids (for example, ammonium, potassium or sodium salts), and mixtures of these acids or salts. For the purposes herein, ammonium bifluoride partially hydrolyzes in contact with water to form some HF, and so is considered an acid herein. The organic acids may be included as salts. In certain embodiments, the treatment fluid 106 includes corrosion inhibitors.

In certain embodiments, the mixtures of one or more solid acid-precursors and one or more solid scale inhibitors, and optionally one or more solid acid-responsive materials, include purely physical mixtures of separate particle types, each particle type including one of the separate components. In certain embodiments, the mixtures include particles manufactured such that one or more solid acid-precursors, solid scale inhibitors and one or more solid acid-responsive materials is in each particle. One example of such manufacturing includes, without limitation, coating the acid-responsive material with the solid acid-precursor, or by heating a physical mixture until the solid acid-precursor melts, mixing thoroughly, cooling, and comminuting the resultant particles. In another manufacturing example, polymers are co-extruded with mineral filler materials, such as talc or carbonates, so that they have altered optical, thermal and/or mechanical properties. Such mixtures of polymers and solids are commonly referred to as "filled polymers".

In one embodiment, the distribution of the components in the mixtures is as uniform as possible. The choices and relative amounts of the components are adjusted for the situation to control the solid acid-precursor hydrolysis rate. The most important factors will be the temperature at which the treatment will be carried out, the composition of the aqueous fluid or fluids with which the mixture will come into contact, and the time and rate desired for generation of the acid.

Each of the individual ingredients, i.e., the solid acid-precursors, scale inhibitors and the optional solid acid-reactive materials, or mixtures/blends/filled polymers of solid acid-precursors, scale inhibitors and optional solid acid-reactive materials may be manufactured in various solid shapes, including, but not limited to fibers, beads, films, ribbons and platelets. Each individual solid material or the mixtures of the solid acid-precursor and the scale inhibitor or the mixtures of solid acid-precursor, scale inhibitor and optional solid acid-reactive material may be coated to slow the hydrolysis. Suitable coatings include polycaprolate (a copolymer of glycolide and epsilon-caprolactone), and calcium stearate, both of which are hydrophobic. Polycaprolate itself slowly hydrolyzes.

Generating a hydrophobic layer on the surface of the solid acid-precursors or the mixtures of solid acid-precursors and solid acid-reactive materials by any means delays the hydrolysis. The term "coating" as used herein may refer to encapsulation or simply to changing the surface by chemical reaction or by forming or adding a thin film of another material. Another suitable method of delaying the hydrolysis of the solid acid-precursor, and the release of acid, is to suspend the solid acid-precursor, optionally with a hydrophobic coating, in oil or in the oil phase of an emulsion. The hydrolysis and acid release do not occur until water contacts the solid acid-precursor. Methods used to delay acid generation may be used in conjunction with inclusion of solid acid-reactive material to accelerate acid generation because it may be desirable to delay acid generation but then to have acid generated rapidly at a later point. The rate of acid generation from a particular solid acid-precursor in the presence of a scale inhibitor or a particular mixture of a solid acid-precursor, a scale inhibitor and a solid acid-reactive material having a particular chemical and physical make-up, including a coating if present, at a particular temperature and in contact with a fluid or fluids of a particular composition (for example pH and the concentration and nature of other components, especially electrolytes), is readily determined by simple fluid analysis involving exposing the acid-precursor to the fluid or fluids under treatment conditions and monitoring the release of acid.

The rate of dissolution of the solid scale inhibitor, and of the solid acid-responsive material, are governed by similar factors (such as by the choice of material, the ratio of materials, the particle size, calcining and coating of the solid material) and may readily be determined by similar fluid analysis. In certain embodiments, the solid acid-precursor particles, or the mixture particles, comprise materials that self-destruct (e.g. by complete hydrolysis and/or dissolution) in situ, that is, in the location where they are placed.

The particle sizes of the individual components of the mixture may be the same or different. Almost any particle size may be used. Examples of relevant factors include the capability of equipment, the width of the fracture generated, and the desired rate and time of particle degradation. The rate of particle degradation is readily determined by simple fluid analysis. In certain embodiments, sizes similar to proppants and fluid loss additives are utilized. Non-limiting examples of suitable particle sizes include particles of similar size to various proppant sizes such as particles meeting a 100 mesh, a 20/40 mesh, and/or a 30/60 mesh size standard. In certain embodiments, particles sizes may be selected that are larger than 20 microns, and/or that are larger than 100 microns. In certain embodiments, solid acid-precursors of the current invention may be used for delayed acid generation in acid fracturing in the ways in which the encapsulated acids described in U.S. Pat. No. 6,207,620, hereby incorporated in its entirety, are used.

Thus one embodiment of the invention is a method of acid fracturing with a solid acid-precursor and a scale inhibitor both present in the fracturing fluid. In certain embodiments, the solid acid-precursor is included in an otherwise conventional acid fracturing treatment (in which the fluid contains an acid such as HCl, HF, an organic acid or mixtures thereof). The initially present acids will tend to spend in the near-wellbore or high permeability region of the formation, but the solid acid-precursor will be carried farther into the fracture and generate acid in situ that will etch the fracture faces farther from the wellbore. In certain embodiments, the solid acid-precursor is included as the only source of acid in the treatment. In certain embodiments, the treatment fluid 106 includes proppant that holds the fracture open until the solid acid-precursor has hydrolyzed and dissolved.

In certain embodiments, the treatment fluid 106 includes the solid acid-precursor and the solid scale inhibitor, wherein both solids act as a proppant until the solids hydrolyze. In certain embodiments, the treatment is an acid fracturing treatment with proppant or without proppant. In certain embodiments, a treatment is conducted as a cost-minimization waterfrac in which a low concentration, for example about 0.05 kg/L, of solid acid-precursor or mixture is pumped at a high rate, for example up to about 3500 L/min or more, with little or no viscosifier in the carrier fluid 105. In certain embodiments, a treatment is conducted as a more conventional fracturing treatment, with viscosifiers in the carrier fluid 105, and higher concentrations, for example up to about 0.6 kg/L, of solid acid-precursor or mixture. The pumping rates, viscosifier amounts, and solid acid-precursor (or mixture) concentrations may vary in certain embodiments and examples are intended as non-limiting illustrations only.

In certain embodiments, viscosifiers include polymers or viscoelastic surfactants typically used in fracturing, frac-packing and gravel packing. When a high concentration of particles of solid acid-precursor or mixture is used, this may necessitate using a more viscous fluid than is usually used in conventional acid fracturing. In certain embodiments, the solid acid-precursor and/or mixture has a lower density than conventional proppants, allowing a lower viscosifier loading. In certain embodiments, the solid acid-precursor or mixture acts as a breaker for the viscosifier, enhancing cleanup of the fracture 110. In certain embodiments, at least a portion of the solid acid-precursor or mixture includes fibers. The use of fibers may reduce or eliminate the need for including viscosifiers in the carrier fluid 105.

The amount of solid acid-precursor or mixture used in the treatment fluid 106 depends upon factors including the temperature and the amount of acid needed. In certain embodiments, the solid acid-precursor is included in an amount between about 0.05 and about 0.6 kg/L. In certain preferred embodiments, the solid acid-precursor is included in an amount between about 0.1 and 0.3 kg/L. In certain embodiments, the solid acid-precursor is included at between about 0.1 and about 0.3 kg/L). In certain embodiments, the amount of scale inhibitor to be used is at least about 0.01 kg/L. In certain embodiments, the treatment fluid 106 further includes a diverter that diverts the fluid containing a solid acid-reactive material from already-present high permeability streaks, vugs, or natural fractures in the formation 104. In certain embodiments, acid generated from solid acid-precursors performs one or more additional functions of: etching fracture faces to increase fracture conductivity, breaking or aiding breaking a polymer or viscoelastic surfactant, dissolving fluid loss additives, and/or dissolving scales or fines.

Figure 2:
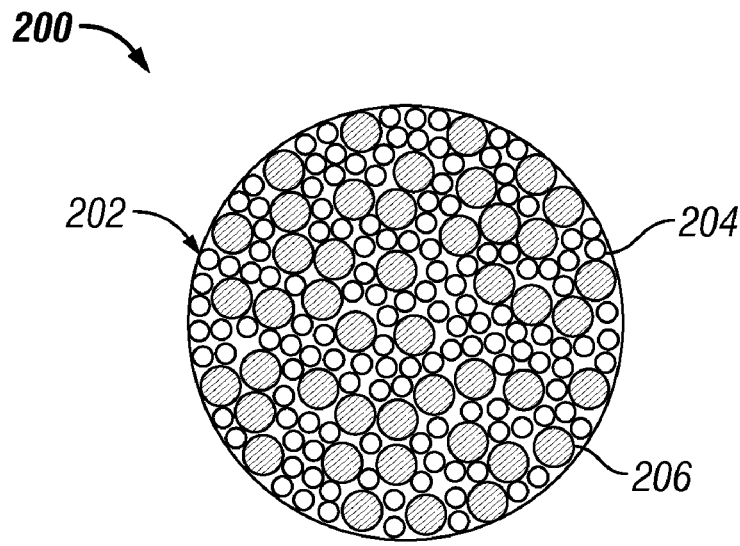
FIG. 2A is a schematic illustration of a solid acid-responsive material combined in a particle with a solid acid-precursor.

FIG. 2A is a schematic illustration 200 of a solid acid-responsive material 204 combined in a particle 202 with a solid acid-precursor 206. In the illustration 200, the solid acid-responsive material 204 comprises a small portion of the particle 202, and as the solid acid-responsive material 204 dissolves and/or reacts, the surface of the particle 202 is disrupted. As the solid acid-responsive material 204 dissolves and/or reacts, the hydrolysis of the solid acid-precursor 206 is enhanced and the solid acid-precursor 206 generates acid in the treatment fluid 106. The mechanism of the solid acid-responsive material 204 enhancing hydrolysis of the solid acid-precursor 206 is shown for illustration only, and in certain embodiments, other mechanisms may be utilized.

Figure 3:
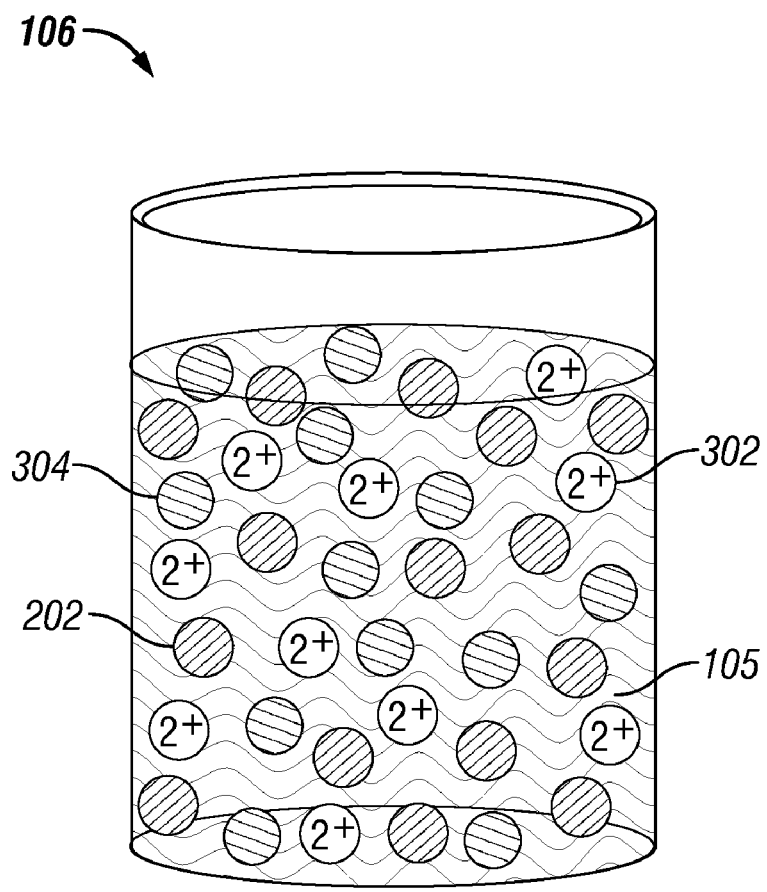
FIG. 3 is a schematic illustration of a treatment fluid.

FIG. 3 is a schematic illustration of a treatment fluid 106. The treatment fluid 106 includes a carrier fluid 105, and a particle 202 having a solid acid-responsive material 204 combined with a solid acid-precursor 206. The treatment fluid 106 is in contact with the solid acid-responsive material 204, in the illustration of FIG. 3 the contact occurs due to the solid acid-responsive material 204 being included on a particle with the solid acid-precursor 206. In certain embodiments (not shown), contact with the solid acid-responsive material 204 occurs within the wellbore 102 and/or the formation 104. In certain embodiments, the solid acid-responsive material 204 is not present in the system 100. The treatment fluid 106 further includes a solid scale inhibitor 304, and is in contact with a divalent activator 302. FIG. 3 is an illustration of one embodiment of a treatment fluid 106, while other embodiments may have components not shown in FIG. 3 or may omit components illustrated in FIG. 3.

The schematic flow diagram and related description which follows provides an illustrative embodiment of performing operations for acid fracturing with scale inhibitor control. Operations illustrated are understood to be exemplary only, and operations may be combined or divided, and added or removed, as well as re-ordered in whole or part, unless stated explicitly to the contrary herein.

Figure 4:
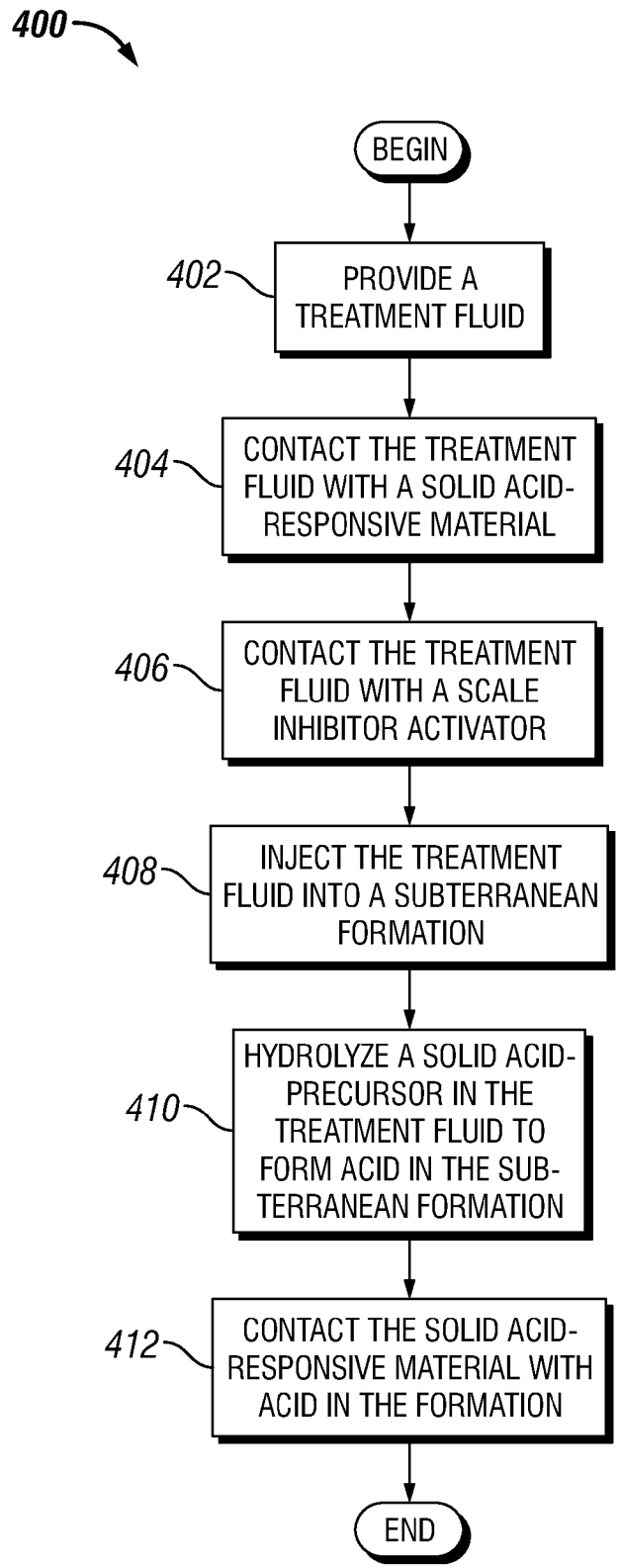
FIG. 4 is schematic flow diagram of a procedure for acid fracturing and inhibiting scale.

FIG. 4 is schematic flow diagram of a technique 400 for acid fracturing and inhibiting scale. The technique 400 includes an operation 402 to provide a treatment fluid including a carrier fluid, a solid acid-precursor, and a solid scale inhibitor. In certain embodiments, the technique 400 further includes an operation 404 to contact the treatment fluid with a solid acid-responsive material. In certain embodiments, the technique 400 further includes an operation 406 to contact the treatment fluid with a scale inhibitor activator, and an operation 408 to inject the treatment fluid into a subterranean formation. In certain embodiments, the technique 400 further includes an operation 410 to hydrolyze a solid acid-precursor in the treatment fluid to form an acid in the subterranean formation. In certain embodiments, the technique further includes an operation 412 to contact the solid acid-responsive material with acid within the formation.

As is evident from the figures and text presented above, a variety of embodiments according to the present invention are contemplated.

In one exemplary embodiment, a method includes providing a treatment fluid including a carrier fluid, a solid acid-precursor, and a solid scale inhibitor. In certain embodiments, the method further includes injecting the treatment fluid into a subterranean formation, and hydrolyzing at least a portion of the solid acid-precursor to form an acid within the subterranean formation. In certain embodiments, the method further includes contacting the treatment fluid with a solid acid-responsive material to the carrier fluid, and/or contacting the solid acid-responsive material with acid within the subterranean formation.

In certain embodiments, the solid acid-responsive material is combined in a particle with the solid acid-precursor. In certain embodiments, the solid acid-responsive material includes magnesium hydroxide, magnesium carbonate, dolomite, calcium carbonate, aluminum hydroxide, calcium oxalate, calcium phosphate, aluminum metaphosphate, sodium zinc potassium pholyphosphate glass, and/or sodium calcium magnesium polyphosphate glass. In certain embodiments, the solid acid-precursor includes cyclic ester dimers of lactic acid, cyclic ester dimers of glycolic acid, homopolymers of lactic acid, homopolymers of glycolic acid, copolymers of lactic acid, copolymers of glycolic acid, and/or a copolymer of at least one of glycolic acid and lactic acid combined with at least one moiety selected from the moieties consisting of a hydroxyl-containing moiety, carboxylic acid-containing moiety, and hydroxycarboxylic acid-containing moiety.

In certain embodiments, the method further includes contacting the treatment fluid with a scale inhibitor activator present in an amount between about 0.1% and 50% by weight of the scale inhibitor. In certain embodiments, the method further includes the scale inhibitor activator being a divalent ion, an ionic salt, and/or calcium chloride.

In one exemplary embodiment, a treatment fluid includes a carrier fluid, a solid acid-precursor, and a solid scale inhibitor. In certain further embodiments, the treatment fluid includes a solid acid-responsive material in contact with the treatment fluid. In certain embodiments, the solid acid-responsive material is physically mixed with the solid acid-precursor. In certain embodiments, the solid acid-responsive material is combined in a particle with the solid acid-precursor. In certain embodiments, the solid acid-responsive material is a material that responds to an acid presence by dissolving and/or reacting.

In certain embodiments, the solid acid-responsive material includes an acid-precursor hydrolysis accelerant. In certain further embodiments, the accelerant is material of a subterranean formation. In certain embodiments, the accelerant includes magnesium hydroxide, magnesium carbonate, dolomite, calcium carbonate, aluminum hydroxide, calcium oxalate, calcium phosphate, aluminum metaphosphate, sodium zinc potassium pholyphosphate glass, and/or sodium calcium magnesium polyphosphate glass.

In certain embodiments, the treatment fluid includes a water-soluble acid-precursor hydrolysis accelerant. In certain further embodiments, the water-soluble acid-precursor hydrolysis accelerant includes an ester, a cyclic ester, a diester, an anhydride, a lactone, an amide, an anhydride, an alkali metal alkoxide, a carbonate, a bicarbonate, an alcohol, an alkali metal hydroxide, an ammonium hydroxide, an amine, and/or an alkanol amine. In certain embodiments, the water-soluble acid-precursor hydrolysis accelerant includes sodium hydroxide, potassium hydroxide, ammonium hydroxide, and/or propylene glycol diacetate.

In certain embodiments, the solid acid-precursor includes cyclic ester dimers of lactic acid, cyclic ester dimers of glycolic acid, homopolymers of lactic acid, homopolymers of glycolic acid, copolymers of lactic acid, and/or copolymers of glycolic acid. In certain embodiments, the solid acid-precursor includes a copolymer of glycolic acid and/or lactic acid, combined with a moiety including a hydroxyl-containing moiety, a carboxylic acid-containing moiety, and/or a hydroxycarboxylic acid-containing moiety. In certain embodiments, the solid acid-precursor further comprises a hydrolysis delaying coating.

In certain embodiments, the treatment fluid includes a scale inhibitor activator present in an amount between about 0.1% and 50% by weight of the scale inhibitor. In certain further embodiments, the scale inhibitor activator includes a divalent ion and/or an ionic salt. In certain embodiments, the activator includes calcium chloride. In certain embodiments, the treatment fluid includes hydrochloric acid, hydrofluoric acid, ammonium bifluoride, formic acid, acetic acid, lactic acid, glycolic acid, aminopolycarboxylic acids, polyaminopolycarboxylic acids, and/or an acid salt. In certain embodiments, the scale inhibitor includes phosphonic acid, a phosphonic acid derivative, phosphate ester, phosphonate, a phosphonate polymer, an acrylate including phosphorous, a methacrylate including phosphorous, polycarboxylate, a polycarboxylate including phosphorous, a sulfonate, polyacrylate, polymethacrylate, phosphino-polyacrylate, a phosphonic acid derivative of ethylene diamine, phosphonic acid [1,2-ethanediylbis[nitrilobis(methylene)]]tetrakis (EDTMPA), a calcium salt of EDTMPA, and/or a sodium salt of EDTMPA.

One exemplary embodiment is a system including a wellbore intersecting a subterranean formation, and an amount of treatment fluid including a carrier fluid, a solid acid-precursor, and a solid scale inhibitor. The system further includes a pump structured to fracture the subterranean formation, and to place the treatment fluid in the fracture. In certain embodiments, the system further includes a solid acid-responsive material in contact with the treatment fluid. In certain embodiments, the system further includes a scale inhibitor activator present in an amount between about 0.1% and 50% by weight of the scale inhibitor. In certain embodiments, the solid acid-precursor further includes a hydrolysis delaying coating. In certain embodiments, the solid acid-precursor includes cyclic ester dimers of lactic acid, cyclic ester dimers of glycolic acid, homopolymers of lactic acid, homopolymers of glycolic acid, copolymers of lactic acid, and/or copolymers of glycolic acid. In certain embodiments, the solid acid-precursor includes a copolymer of glycolic acid and/or lactic acid, combined with a hydroxyl-containing moiety, carboxylic acid-containing moiety, and/or a hydroxycarboxylic acid-containing moiety.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A treatment fluid, comprising:
   a carrier fluid;
   a solid acid-precursor; and
   a solid scale inhibitor.

2. The treatment fluid of claim 1, further comprising a solid acid-responsive material in contact with the treatment fluid.

3. The treatment fluid of claim 2, wherein the solid acid-responsive material is physically mixed with the solid acid-precursor.

4. The treatment fluid of claim 3, wherein the solid acid-responsive material is combined in a particle with the solid acid-precursor.

5. The treatment fluid of claim 2, wherein the solid acid-responsive material comprises an acid-precursor hydrolysis accelerant.

6. The treatment fluid of claim 5, wherein the accelerant comprises material of a subterranean formation.

7. The treatment fluid of claim 5, wherein the accelerant comprises at least one material selected from the materials consisting of magnesium hydroxide, magnesium carbonate, dolomite, calcium carbonate, aluminum hydroxide, calcium oxalate, calcium phosphate, aluminum metaphosphate, sodium zinc potassium polyphosphate glass, and sodium calcium magnesium polyphosphate glass.

8. The treatment fluid of claim 2, wherein the solid acid-responsive material is structured to respond to an acid presence by at least one action selected from the group consisting of dissolving and reacting.

9. The treatment fluid of claim 1, further comprising a water-soluble acid-precursor hydrolysis accelerant.

10. The treatment fluid of claim 9, wherein the water-soluble acid-precursor hydrolysis accelerant comprises at least one accelerant selected from the group consisting of an ester, a cyclic ester, a diester, an anhydride, a lactone, an amide, an alkali metal alkoxide, a carbonate, a bicarbonate, an alcohol, an alkali metal hydroxide, an ammonium hydroxide, an amine, and an alkanol amine.

11. The treatment fluid of claim 9, wherein the water-soluble acid-precursor hydrolysis accelerant comprises at least one accelerant selected from the group consisting of sodium hydroxide, potassium hydroxide, ammonium hydroxide, and propylene glycol diacetate.

12. The treatment fluid of claim 1, further comprising a scale inhibitor activator present in an amount between about 0.1% and 50% by weight of the scale inhibitor.

13. The treatment fluid of claim 12 wherein the scale inhibitor activator comprises one component selected from the group consisting of a divalent ion and an ionic salt.

14. The treatment fluid of claim 12, wherein the scale inhibitor activator comprises calcium chloride.

15. The treatment fluid of claim 1, wherein the solid acid-precursor comprises at least one precursor selected from the group consisting of cyclic ester dimers of lactic acid, cyclic ester dimers of glycolic acid, homopolymers of lactic acid, homopolymers of glycolic acid, copolymers of lactic acid, and copolymers of glycolic acid.

16. The treatment fluid of claim 1, wherein the solid acid-precursor includes a copolymer of at least one of glycolic acid and lactic acid combined with at least one moiety selected from the moieties consisting of a hydroxyl-containing moiety, carboxylic acid-containing moiety, and hydroxycarboxylic acid-containing moiety.

17. The treatment fluid of claim 1, wherein the carrier fluid comprises at least one acid selected from the group consisting of hydrochloric acid, hydrofluoric acid, ammonium bifluoride, formic acid, acetic acid, lactic acid, glycolic acid, aminopolycarboxylic acids, polyaminopolycarboxylic acids, and an acid salt.

18. The treatment fluid of claim 1, wherein the scale inhibitor includes an inhibitor selected from the group consisting of phosphonic acid, a phosphonic acid derivative, phosphate ester, phosphonate, a phosphonate polymer, an acrylate including phosphorous, a methacrylate including phosphorous, polycarboxylate, a polycarboxylate including phosphorous, a sulfonate, polyacrylate, polymethacrylate, phosphinopolyacrylate, a phosphonic acid derivative of ethylene diamine, phosphonic acid [1,2-ethanediylbis[nitrilobis(methylene)]]tetrakis (EDTMPA), a calcium salt of EDTMPA, and a sodium salt of EDTMPA.

19. The treatment fluid of claim 1, wherein the solid acid-precursor further comprises a hydrolysis delaying coating.

20. The treatment fluid of claim 1, wherein the solid acid-precursor is present in an amount between about 0.05 and about 0.6 kg/L.

21. The treatment fluid of claim 1, wherein the solid acid-precursor is present in an amount between about 0.1 and about 0.3 kg/L.

22. The treatment fluid of claim 1, wherein the solid scale inhibitor comprises a particle size greater than about 20 microns.

23. The treatment fluid of claim 1, wherein the solid scale inhibitor comprises a particle size greater than about 100 microns.

24. A system, comprising:
a wellbore intersecting a subterranean formation;
an amount of treatment fluid, comprising:
a carrier fluid,
a solid acid-precursor, and
a solid scale inhibitor comprising a particle size greater than about 20 microns; and
a pump structured to fracture the subterranean formation, and to place the treatment fluid in the fracture.

25. The system of claim 24, further comprising a solid acid-responsive material in contact with the treatment fluid.

26. The system of claim 24, further comprising a scale inhibitor activator present in an amount between about 0.1% and 50% by weight of the scale inhibitor.

27. The system of claim 24, wherein the solid acid-precursor further comprises a hydrolysis delaying coating.

28. The system of claim 24, wherein the solid acid-precursor comprises at least one precursor selected from the group consisting of cyclic ester dimers of lactic acid, cyclic ester dimers of glycolic acid, homopolymers of lactic acid, homopolymers of glycolic acid, copolymers of lactic acid, and copolymers of glycolic acid.

29. The system of claim 24, wherein the solid acid-precursor includes a copolymer of at least one of glycolic acid and lactic acid combined with at least one moiety selected from the moieties consisting of a hydroxyl-containing moiety, carboxylic acid-containing moiety, and hydroxycarboxylic acid-containing moiety.

* * * * *